Oct. 7, 1924.  
M. EDEL  
1,510,770  
WEEDING AND CULTIVATING GARDEN HOE  
Filed Sept. 8, 1923
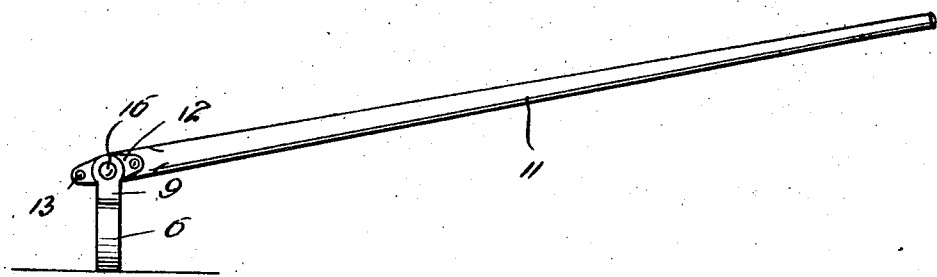
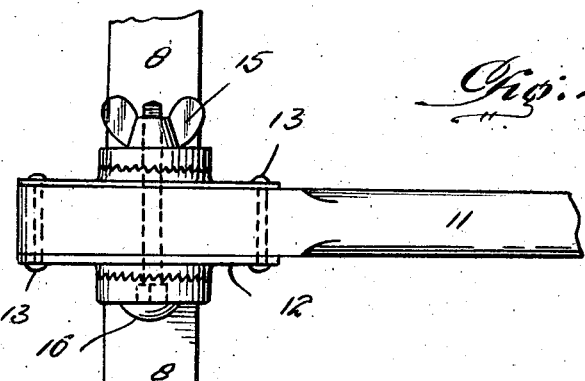
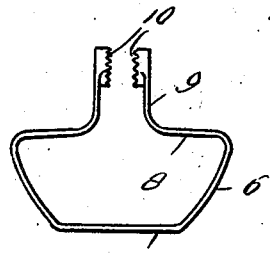
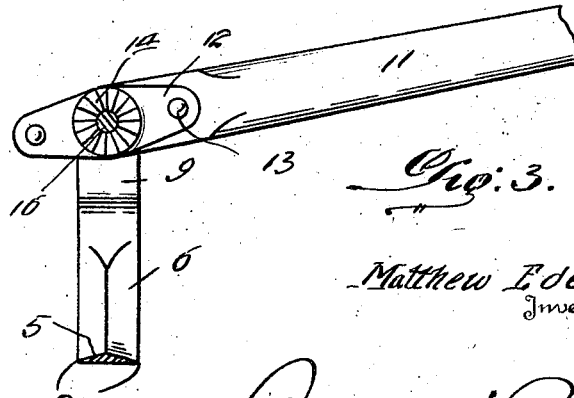
Matthew Edel, Inventor Patented Oct. 7, 1924.

1,510,770

UNITED STATES PATENT OFFICE.

MATTHEW EDEL, OF HAVERHILL, IOWA.

WEEDING AND CULTIVATING GARDEN HOE.

Application filed September 8, 1923. Serial No. 661,598.

*To all whom it may concern:*

Be it known that I, MATTHEW EDEL, citizen of the United States, residing at Haverhill, in the county of Marshall and State of Iowa, have invented certain new and useful Improvements in Weeding and Cultivating Garden Hoes, of which the following is a specification.

This invention relates to certain new and useful improvements in garden hoes and has particular reference to a special form of hoe particularly adaptable for weeding and cultivating purposes.

The primary object of the invention is to provide a hoe of the above kind which embraces the desired qualities of simplicity and durability of construction, as well as efficiency in operation.

Another object of the invention is to provide a hoe of the above kind having a blade by means of which the weed may be destroyed close to the stalk of the plant without material danger of damaging the roots of the plant.

Other objects will appear as the nature of the invention is better understood, and the same consists in the novel form, combination, and arrangement of parts hereinafter more fully described, shown in the accompanying drawings and claimed.

In the drawing, wherein like reference characters indicate corresponding parts throughout the several views:

Figure 1 is a side elevational view of a hoe constructed in accordance with the present invention.

Figure 2 is an enlarged fragmentary top plan view of the device shown in Figure 1.

Figure 3 is a fragmentary view, partly in side elevation and partly in vertical section of the device shown in Figure 1, drawn on a larger scale, and Figure 4 is an enlarged front elevational view of the whole blade detached.

Referring more in detail to the drawing, the invention embodies a special form of blade constructed of a strip of metal of substantially uniform width so as to be of substantially stirrup shape in front and rear elevation, the blade including a body portion of substantially U-shape composed of a flat intermediate lower member 5 and upwardly converging arms 6 at the sides of the device, both the front and rear edges of the body portion being sharpened as indicated at 7 in Figure 3. The strip of metal forming the blade is extended as at 8 from the upper ends of the legs 6 of the body portion and then upturned in closely related spaced relation as at 9, the free ends of the arms 9 being preferably thickened and provided with ratchet teeth 10 upon their adjacent faces, as clearly shown.

The hoe also embodies a suitable relatively long handle 11 having bearing and wear plates 12 suitably bolted or riveted as at 13 against opposite sides of the forward end thereof, which plates are provided upon their outer surfaces with ratchet teeth 14 adapted to cooperate with the teeth 10 on the arms 9 for maintaining the hoe blade at the desired angle to the handle upon tightening of the nut 15 which is threaded upon one end of the bolt 16 that extends through the handle, the plate 12 and the free ends of the arms 9. The bolt 16 thus forms a pivot extending transversely of the handle, whereby the hoe blade may be swung relative to the handle for changing the desired angular relation of the handle to the blade, which change or adjustment of the blade may be fixed upon tightening of the nut 15 on said bolt, so as to bring the teeth 10 and 14 into engagement with each other.

Due to the upwardly diverging arrangement of the blade arms 6, it is possible to cultivate and destroy weeds close to the source of the plant without danger of destroying the roots of the latter. This is apparent from Figure 4, wherein the blade is wider at the top than at the bottom. In other words, the intermediate portion 5 is relatively short so as to have its ends terminate inwardly of the upper ends of the arms 6 and to thereby clear the roots of the plant when the portion 5 is forced downwardly into the ground.

In operation, the hoe may be reciprocated parallel with the longitudinal axis of the handle 11 so that the device will cultivate and destroy weeds when moving in either direction due to the provision of sharpened edges 7 at both the front and rear sides of the body portion of the blade. This permits expeditious cultivation and destroying of weeds because no lost motion is had.

From the foregoing description, it is believed that the construction and operation as well as the advantages of the invention will be readily understood and appreciated by those skilled in the art.

Minor changes may be made without departing from the spirit and scope of the invention as claimed.

What I claim as new is:

A weeding hoe comprising a strip of metal having an intermediate blade portion with cutting edges at the opposite side edges thereof, the strip having an intermediate part adapted to operate in a horizontal position in the soil and which is extended at its ends into upwardly and outwardly inclined parts, the said cutting edges extending along the said intermediate part and the inclined parts, the upper ends of the inclined parts merging into inwardly disposed sections which lie approximately parallel with the said intermediate part and the said inwardly disposed sections merging into upwardly disposed arms adapted to be applied to the opposite sides of a handle.

In testimony whereof I affix my signature.

MATTHEW EDEL.